Patented Sept. 11, 1923.

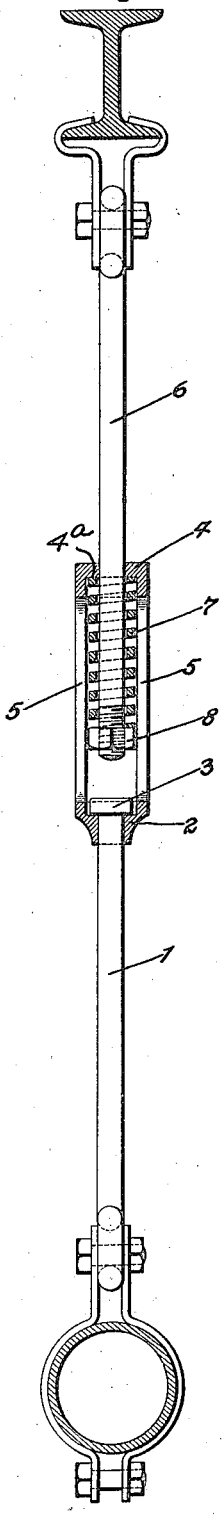

1,467,872

UNITED STATES PATENT OFFICE.

ELMER C. MITCHELL, OF ST. LOUIS, MISSOURI.

ADJUSTABLE SPRING TURNBUCKLE AND HANGER.

Application filed August 29, 1921. Serial No. 496,657.

*To all whom it may concern:*

Be it known that I, ELMER C. MITCHELL, a citizen of the United States, residing at St. Louis, Missouri, have invented a new and useful Adjustable Spring Turnbuckle and Hanger, of which the following is a specification.

This invention relates to an adjustable turnbuckle and hanger.

An object of the invention is to provide an improved adjustable turn-buckle and hanger, including a pair of connecting rods, a connecting link having swivel connection with the adjacent ends of the rods, a spring within the connecting link and encircling the end portion of one of the rods within the link, and a device cooperating with the link for varying the tension of the spring.

Another object of the invention is to provide a device of the character mentioned, including a pair of connecting rods, a connecting link having swivel connection with the adjacent ends of the rods and arranged to engage a nut on the adjacent end of one of the rods to hold the nut from turning when the link is stationary and to turn the nut when the link is turned in order to vary the tension of a spring interposed between the nut and the link.

Other objects and advantages will appear from the following description, in which reference is made to the drawing, showing a preferred embodiment of the invention.

The invention may be applied to various uses, and is by no means restricted to the use shown.

As shown, the connecting rod 1 extends through a hole in the end 2 of a connecting link. The inner end of the rod 1 has a head 3 thereon engaging the inner wall of the end 2 of the link and forming a swivel connection with the link.

The opposite end 4 of the connecting link is united with the end 2 thereof by a pair of connections 5, preferably located diametrically opposite from each other.

The connecting rod 6 extends through the end 4 of the link and terminates preferably some distance from the head 3 of the other connecting rod. The inner end of the connecting rod 6 is threaded for a considerable distance.

A spiral spring 7 encircles the rod 6 between the side members 5 of the connecting link, and has one end bearing against the inner wall of the end 4 within an annular spring seat 4$^a$ and the opposite end bearing against a nut 8 screwed on the threaded end of the rod 6. The annular spring seat 4$^a$ holds the spring 7 properly centered so that the coils of the spring will not forcibly engage the rod 6.

The connecting link may be turned on both connecting rods, and the spring may or may not turn with the link. Opposite sides of the nut 8 are close to the inner surfaces of the connections 5 of the connecting link, so that neither the nut nor the link may turn relative to each other. By this construction the link holds the nut from turning when the link is stationary and provides for the easy application of a wrench or other appropriate tool to turn either the nut and thereby the link, or vice versa. In either case, both the nut and the connecting link are made to turn with the other and neither can turn independently of the other.

When it is desired to turn the nut in either direction, this may be done by turning the nut itself in the desired direction or by turning the connecting link. Thus, the nut may be screwed on or off of the rod 6, or to different positions thereon in order to vary the tension or power of the spring 7.

There is sufficient space between the end of the rod 6 and the head 3 to permit the insertion and removal of the nut.

I do not restrict myself to the precise form and arrangement shown, nor to any other unessential particulars, but what I claim and desire to secure by Letters Patent is:—

In a device of the character described, a connecting link comprising two opposite end portions, two diametrically opposite side members connecting the end portions and an annular spring seat in connection with one of said end portions; a rod having swivel connection with the end portion opposite from said spring seat so that said rod can freely move without disturbing the position of said spring; an additional rod extending through the end portion having the spring seat in connection therewith, and extending relatively a considerable distance toward the opposite end portion; a spring encircling said second rod and having one end seated in said spring seat; and a polygonal nut secured on the inner end of said second rod and having the side walls thereof in position to be engaged by said side members to prevent said nut or said link from being turned independently of each other.

ELMER C. MITCHELL.